US012591981B2

(12) United States Patent
Speranzon et al.

(10) Patent No.: US 12,591,981 B2
(45) Date of Patent: Mar. 31, 2026

(54) EFFECTIVE METHOD TO ESTIMATE POSE, VELOCITY AND ATTITUDE WITH UNCERTAINTY

(71) Applicant: Honeywell International Inc., Charlotte, NC (US)

(72) Inventors: Alberto Speranzon, Maple Grove, MN (US); Carl Arthur Dins, Phoenix, AZ (US); Juan Hu, Shanghai (CN); Arjun Bindu Jyothikumar, Seattle, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 490 days.

(21) Appl. No.: 18/171,069

(22) Filed: Feb. 17, 2023

(65) Prior Publication Data
US 2024/0289966 A1 Aug. 29, 2024

(51) Int. Cl.
*G06T 7/246* (2017.01)
*B64U 10/00* (2023.01)
(Continued)

(52) U.S. Cl.
CPC .............. *G06T 7/246* (2017.01); *B64U 10/00* (2023.01); *G06N 20/00* (2019.01); *G06T 7/262* (2017.01);
(Continued)

(58) Field of Classification Search
None
See application file for complete search history.

(56) References Cited

U.S. PATENT DOCUMENTS 9,070,289 B2    6/2015  Saund et al.
9,459,692 B1   10/2016  Li
(Continued)

FOREIGN PATENT DOCUMENTS

CN      112419411 A      2/2021
CN      115018926 A      9/2022

OTHER PUBLICATIONS

Andrés Bruhn et al., "Confidence Measures for Variational Optic Flow Methods," Fachrichtung 6.1—Mathematik, Universität des Saarlandes, 21 pages, (Jan. 1, 2004).
(Continued)

*Primary Examiner* — Helen Zong
(74) *Attorney, Agent, or Firm* — Alston & Bird LLP

(57) ABSTRACT

Disclosed are methods and systems for utilizing an uncertainty map to select a best set of optical flow estimates for one or more vehicles. For instance, a method may include receiving one or more images captured by one or more cameras of at least one vehicle, analyzing the one or more images by inputting the one or more images into a trained machine-learning model, wherein the trained machine-learning model is configured to process the one or more images to determine an optical flow map and an uncertainty map, determining a feature map based on the optical flow map, determining an improved feature map by applying the uncertainty map to the feature map, transforming the improved feature map by applying at least one transformation or optimization to the improved feature map, and based on the transformed improved feature map, estimating a pose value, a velocity value, or an attitude value.

20 Claims, 6 Drawing Sheets

(51) Int. Cl.
    *B64U 101/30*       (2023.01)
    *G06N 20/00*       (2019.01)
    *G06T 7/262*       (2017.01)

(52) U.S. Cl.
    CPC ...... *B64U 2101/30* (2023.01); *G06T 2200/24* (2013.01); *G06T 2207/10032* (2013.01); *G06T 2207/30252* (2013.01)

(56) References Cited

U.S. PATENT DOCUMENTS

| | | | |
|---|---|---|---|
| 10,762,643 B2 | 9/2020 | Buczko et al. | |
| 2022/0108544 A1* | 4/2022 | Becker ................. | G06V 10/806 |
| 2022/0391867 A1* | 12/2022 | Glaser ..................... | G06F 3/016 |
| 2022/0392089 A1 | 12/2022 | Guizilini et al. | |
| 2023/0045686 A1* | 2/2023 | Philipp ................. | B25J 9/1697 |
| 2023/0228527 A1* | 7/2023 | Squillace .......... | G01C 21/1656 244/3.15 |
| 2024/0078790 A1* | 3/2024 | Sundareshan ........ | G06V 10/806 |
| 2024/0127534 A1* | 4/2024 | Wang ..................... | G06T 19/20 |
| 2024/0203590 A1* | 6/2024 | Kotz .................... | G06V 10/764 |
| 2025/0104423 A1* | 3/2025 | Wen ........................ | G06V 10/82 |
| 2025/0166352 A1* | 5/2025 | Emad Marvasti ........ | G06T 7/70 |

OTHER PUBLICATIONS

Anne S. Wannenwetsch et al., "ProbFlow: Joint Optical Flow and Uncertainty Estimation," 2017 IEEE International Conference on Computer Vision, 1182-1191, (Oct. 22, 2017).

Extended European Search Report Mailed on Jul. 26, 2024 for EP Application No. 24153484, 9 page(s).

Serin Lee et al., "Fast Uncertainty Estimation for Deep Learning Based Optical Flow," 2020 IEEE/RSJ International Conference on Intelligent Robots and Systems (IROS), 10138-10144, (Oct. 24, 2020).

EP Office Action Mailed on Mar. 24, 2025 for EP Application No. 24153484, 6 page(s).

Intention to grant Mailed on Nov. 12, 2025 for EP Application No. 24153484, 6 page(s).

\* cited by examiner

200

VEHICLE 202

CAMERA 204

206

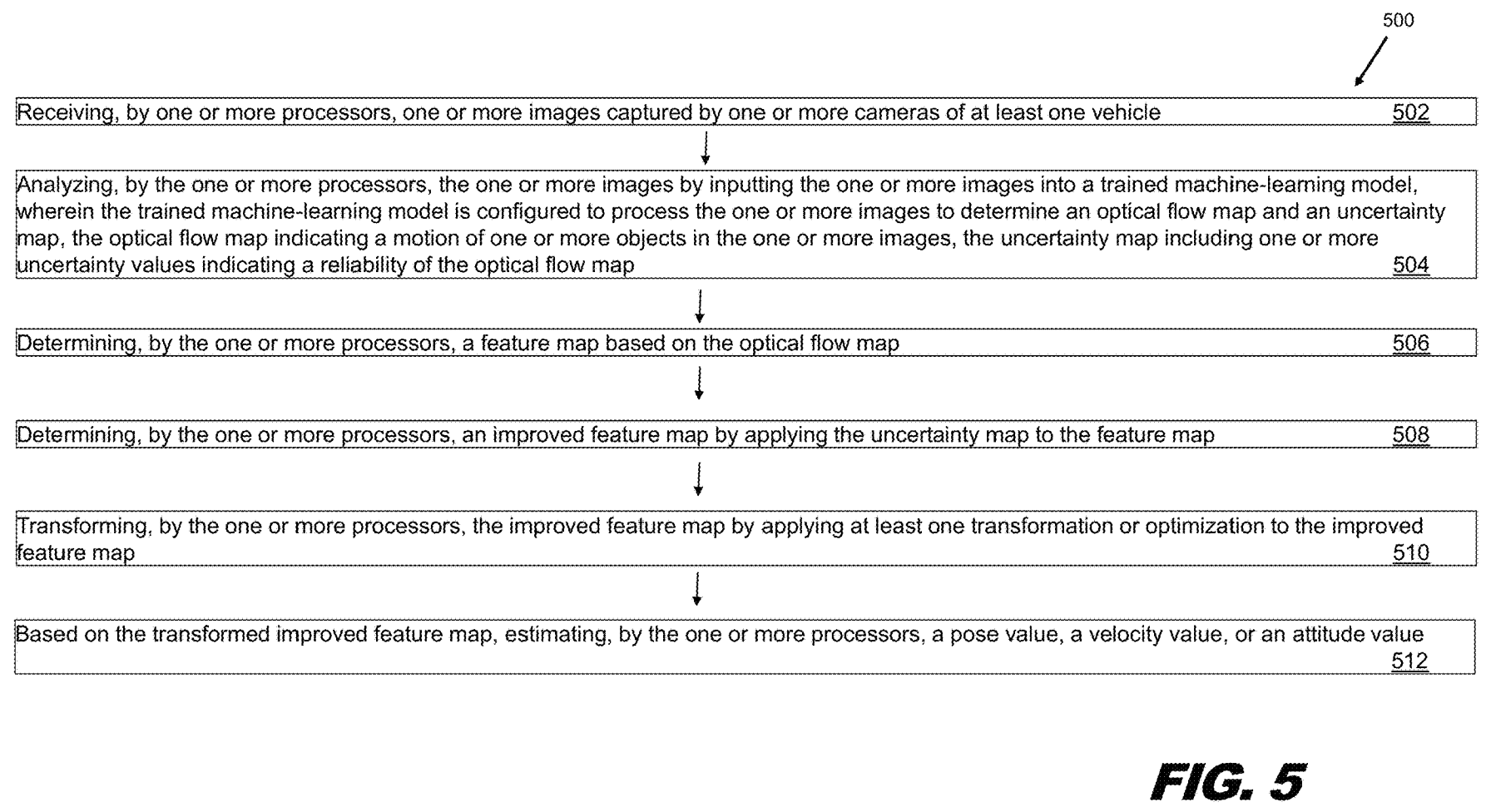

500

Receiving, by one or more processors, one or more images captured by one or more cameras of at least one vehicle    502

Analyzing, by the one or more processors, the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map    504

Determining, by the one or more processors, a feature map based on the optical flow map    506

Determining, by the one or more processors, an improved feature map by applying the uncertainty map to the feature map    508

Transforming, by the one or more processors, the improved feature map by applying at least one transformation or optimization to the improved feature map    510

Based on the transformed improved feature map, estimating, by the one or more processors, a pose value, a velocity value, or an attitude value    512

*FIG. 5*

EFFECTIVE METHOD TO ESTIMATE POSE, VELOCITY AND ATTITUDE WITH UNCERTAINTY

TECHNICAL FIELD

Various embodiments of the present disclosure relate generally to methods and systems to utilizing an uncertainty map to select a best set of optical flow estimates for one or more vehicles generally.

BACKGROUND

Unmanned aerial vehicles (UAV) and urban air mobility (UAM) are often used as transportation tools for cargo or passengers. Autonomous flight, autonomous taking off, and autonomous landing may have strict safety requirements. For example, pose, velocity, and attitude of UAVs and UAMs are important information for UAV and UAM safety, autonomy, and controls. It is important to efficiently and effectively estimate the pose, velocity, and attitude of the UAVs and UAMs. Conventional techniques do not allow for the use of uncertainty maps to assist in indicating the reliability of optical flow data. Thus, there exists a need to efficiently and effectively estimate the pose, velocity, and attitude of UAVs and UAMs.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for utilizing an uncertainty map to select a best set of optical flow estimates for one or more vehicles.

In one aspect, an exemplary embodiment of a method for utilizing an uncertainty map to select a best set of optical flow estimates for one or more vehicles is disclosed. The method may include receiving, by one or more processors, one or more images captured by one or more cameras of at least one vehicle. The method may further include analyzing, by the one or more processors, the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map. The method may further include determining, by the one or more processors, a feature map based on the optical flow map. The method may further include determining, by the one or more processors, an improved feature map by applying the uncertainty map to the feature map. The method may further include transforming, by the one or more processors, the improved feature map by applying at least one transformation or optimization to the improved feature map. The method may further include, based on the transformed improved feature map, estimating, by the one or more processors, a pose value, a velocity value, or an attitude value.

In one aspect, a computer system for utilizing an uncertainty map to select a best set of optical flow estimates for one or more vehicles is disclosed. The computer system may include a memory having processor-readable instructions stored therein, and one or more processors configured to access the memory and execute the processor-readable instructions, which when executed by the one or more processors configures the one or more processors to perform a plurality of functions. The functions may include receiving one or more images captured by one or more cameras of at least one vehicle. The functions may further include analyzing the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map. The functions may further include determining a feature map based on the optical flow map. The functions may further include determining an improved feature map by applying the uncertainty map to the feature map. The functions may further include transforming the improved feature map by applying at least one transformation or optimization to the improved feature map. The functions may further include, based on the transformed improved feature map, estimating a pose value, a velocity value, or an attitude value.

In one aspect, a non-transitory computer-readable medium containing instructions for utilizing an uncertainty map to select a best set of optical flow estimates for one or more vehicles is disclosed. The instructions may include receiving one or more images captured by one or more cameras of at least one vehicle. The instructions may further include analyzing the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map. The instructions may further include determining a feature map based on the optical flow map. The instructions may further include determining an improved feature map by applying the uncertainty map to the feature map. The instructions may further include transforming the improved feature map by applying at least one transformation or optimization to the improved feature map. The instructions may further include, based on the transformed improved feature map, estimating a pose value, a velocity value, or an attitude value.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts a flowchart of an exemplary method for utilizing an uncertainty map to select a best set of optical flow estimates for one or more vehicles, according to one or more embodiments.

DETAILED DESCRIPTION OF EMBODIMENTS

Figure 1:
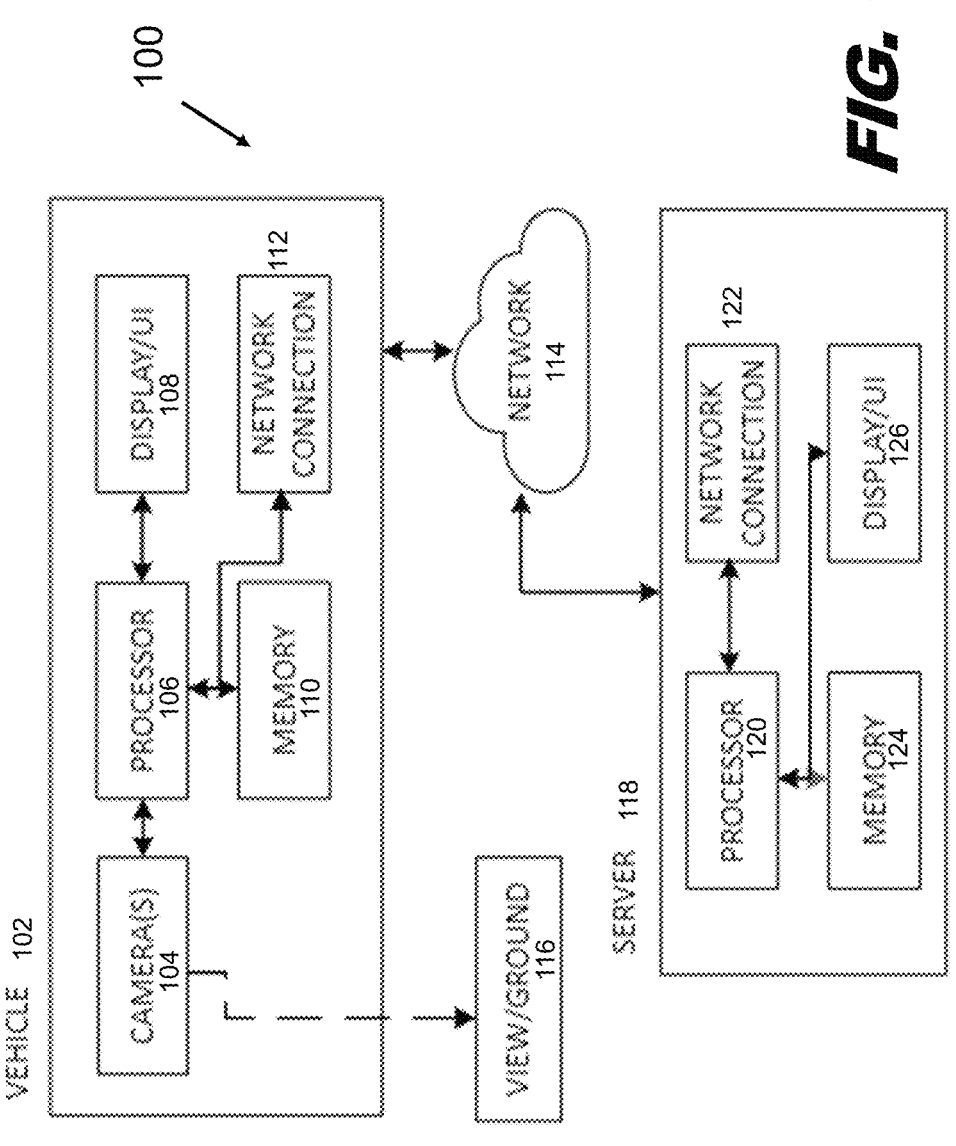
FIG. 1 is a schematic diagram illustrating an example environment implementing methods and systems of this disclosure, according to one or more embodiments.

According to certain aspects of the disclosure, methods and systems are disclosed for utilizing an uncertainty map to select a best set of optical flow estimates for one or more vehicles. Conventional techniques may not be suitable at least because conventional techniques, among other things, do not allow for the use of an uncertainty map (also referred to as an "uncertainty mask") to determine the reliability of optical flow output. Additionally, conventional techniques may not include the ability to utilize a machine-learning model to increase efficiency and accuracy of the system. Accordingly, improvements in technology relating to utilizing an uncertainty map to select a best set of optical flow estimates for one or more vehicles are needed.

Unmanned aerial vehicles (UAV) and urban air mobility (UAM) are often used as transportation tools for cargo and/or passengers. Autonomous flight, autonomous taking off, and autonomous landing may have very strict safety requirements. The pose, velocity, and attitude of UAVs and/or UAMs are important and essential information for UAV and UAM safety, autonomy, and control. As a result, there is a demand for an effective and efficient method to estimate pose, velocity, and attitude of a UAV or UAM.

Advantages of such a system may include an optical flow network trained to estimate the optical flow and output an uncertainty map, which may indicate the reliability of the optical flow. The uncertainty map may help to select a best set of optical flow estimates and may also reject the outliers. Additional advantages may include fewer outliers that may lead to less time cost and higher precision when estimating the pose, velocity, and attitude.

The systems and methods disclosed herein relate to utilizing an uncertainty map to select a best set of optical flow estimates for one or more vehicles. The systems and methods may include receiving, by one or more processors, one or more images captured by one or more cameras of at least one vehicle. The systems and methods may further include analyzing, by the one or more processors, the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map. The systems and methods may further include determining, by the one or more processors, a feature map based on the optical flow map. The systems and methods may further include determining, by the one or more processors, an improved feature map by applying the uncertainty map to the feature map. The systems and methods may further include transforming, by the one or more processors, the improved feature map by applying at least one transformation or optimization to the improved feature map. The systems and methods may further include, based on the transformed improved feature map, estimating, by the one or more processors, a pose value, a velocity value, or an attitude value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Exemplary Environment

FIG. 1 depicts an example of a system environment 100 in which systems, methods, and other aspects of the present disclosure may be implemented. The system environment 100 of FIG. 1 may include a vehicle 102, a network 114, and server 118. Vehicle 102 may include camera(s) 104 and processor 106 that may be in communication with a plurality of other components such as camera(s) 104, memory 110, display/user interface (UI) 108, and network connection 112. Processor 106 may include one or more processors that comprise the computing and flight management systems of vehicle 102.

Memory 110 may be one or more components configured to store data related to vehicle 102, including instructions for operating flight components and vehicle systems (e.g., autopilot, route planning, communication). Processor 106 and memory 110 may display information to, and receive inputs from an operator of vehicle 102 via display/UI 108. Display/ UI 108 may be of any suitable type, such as one or more monitors, touchscreen panels, heads-up displays, and may include operator input devices such as joysticks, buttons, touch-responsive panels, mice, trackpads, voice recognition devices, and the like. As the vehicle operates, processor 106 may generate one or more graphical user interfaces (GUIs) for display on display/UI 108, to provide relevant and useful information to operators and/or passengers of vehicle 102.

In some embodiments, processor 106 may communicate with environment camera(s) 104. The camera(s) 104 may include infrared or optical cameras, LIDAR, or other visual imaging systems to record internal or external environments of the vehicle 102. The camera(s) 104 may obtain infrared images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 104 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed. The imaging data and/or the machine vision outputs may be referred to as "imaging output data." The camera(s) 104 may transmit the imaging data and/or the machine vision outputs of the machine vision function to the vehicle 102 and/or network 114. Without deviating from the scope of this disclosure, vehicle 102 may have additional elements that can be in communication with processor 106.

Vehicle 102 may use network connection 112 to communicate with other elements of the system environment, for example, via network 120 or directly by radio communication. Network 114 may be implemented as, for example, the internet, a wireless network, Bluetooth, Near Field Communication (NFC), or any other type of network or combination of networks that provides communications between one or more components of the system environment 100. In some embodiments, the network 114 may be implemented using a suitable communication protocol or combination of protocols such as a wired or wireless internet connection in combination with a cellular data network.

One or more servers 118 may be repositories for system information such as map data, building data, flight plan data, and the like. Server 118 may include a processor 120, a network connection 122, a memory 124, and a display/UI 126. Memory 124 may store data, processor 120 may access and organize the stored data to respond to requests and provide updates to the stored data, and information may be provided to other elements in system environment 100 via network connection 122. Display/UI 126 may be of any suitable type, such as one or more monitors, touchscreen panels, heads-up displays, and may include operator input devices such as joysticks, buttons, touch-responsive panels, mice, trackpads, voice recognition devices, and the like. In some embodiments, server 118 may communicate directly with vehicle 102 via network 114.

In the following methods, various acts may be described as performed or executed by a component from FIG. 1. However, it should be understood that in various embodiments, various components of the system environment 100 discussed herein may execute instructions or perform acts including the acts discussed herein. An act performed by a device may be considered to be performed by a processor, actuator, or the like associated with that device. Further, it should be understood that in various embodiments, various steps may be added, omitted, and/or rearranged in any suitable manner.

Exemplary Vehicle System

Figure 2:
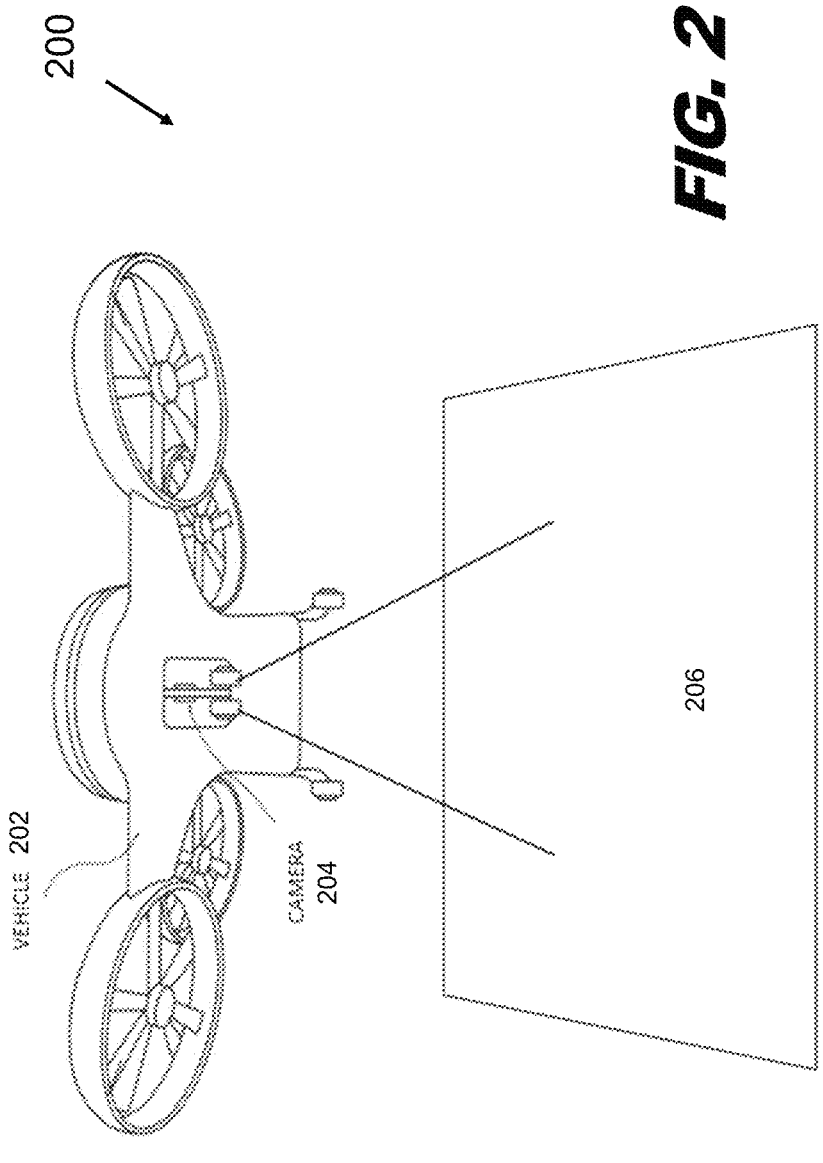
FIG. 2 is a diagram of a vehicle capturing an image, according to one or more embodiments.

FIG. 2 illustrates a diagram of an exemplary vehicle system of the present disclosure. Vehicle 202 may include one or more cameras 204 (e.g., camera(s) 104). One or more cameras 204 may capture one or more images of terrain 206. Terrain 206 may include any geographical area that vehicle 202 passes over. Camera(s) 204 may capture the images of the terrain 206 as the vehicle passes over terrain 206, without stopping. The one or more images may be utilized in the methods described below.

Vehicle 202 may take off from, or land at, a vertiport. The vertiport may be configured to provide vehicle 202 with information, such as information regarding air traffic, weather conditions, obstacles, and/or other information useful for the flight of vehicle 202. The vertiport may include a processor, an RF/cellular transceiver, a memory, and one or more environment sensors. Environment sensors may include, for example, sensors to determine weather conditions, traffic conditions, and/or other information that may be relevant to vehicle as it takes off from, or lands at, the vertiport. The processor and memory may collect and transmit information via a RF/cellular transceiver, for example, information collected by environment sensors. The vertiport may also be in communication with, for example, air traffic control, meteorologists, and/or one or more databases. Further, the vertiport may be configured to relay requests for information from the vehicle 202 to a database via its RF/cellular transceiver or other network connection.

Exemplary Process for Selecting a Best Set of Optical Flow Estimates

Figure 3:
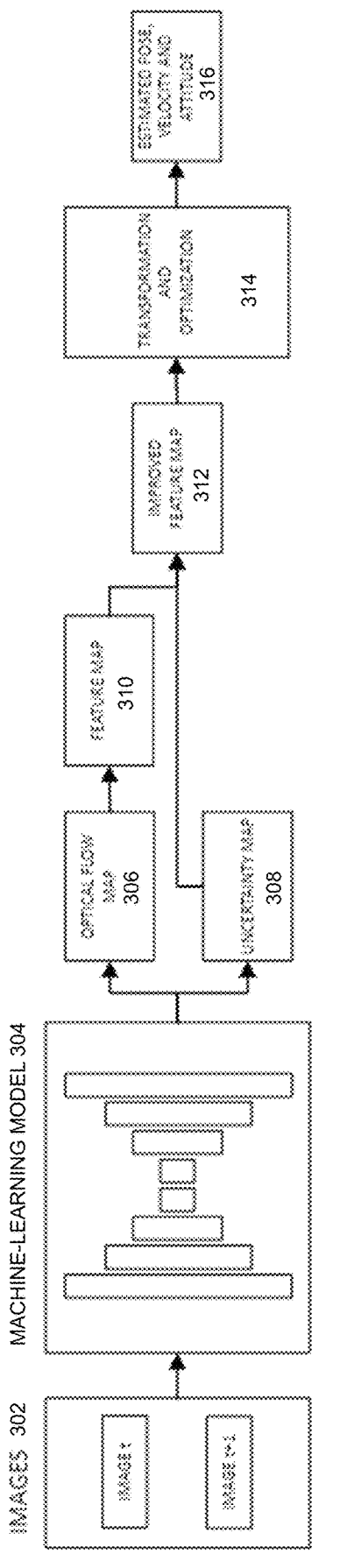
FIG. 3 is a flowchart illustrating a method for selecting a best set of optical flow estimates for one or more vehicles, according to one or more embodiments.

FIG. 3 is a flowchart illustrating a method 300 for selecting a best set of optical flow estimates for one or more vehicles, according to one or more embodiments. Exemplary method 300 may be executed on one or more components of FIGS. 1-2.

In step 302, the method may include one or more devices capturing one or more images. For example, the one or more images may be captured by camera(s) 104 (e.g., cameras 204). The one or more images may include at least one image captured at time t and at least one image captured at time t+1. Each of the one or more images may be comprised of one or more pixels. Additionally, each of the one or more images may include one or more objects.

In step 304, the method may include a machine-learning model 304 receiving the one or more images as input. In some embodiments, the machine-learning model 304 may estimate and output an optical flow and an uncertainty map. Additional details regarding the machine-learning model may be further described below.

In step 306, the method may include the machine-learning model 304 outputting an optical flow map 306. The optical flow map 306 may indicate how one or more pixels of the one or more images moves from one point to another. The optical flow may include the motion of objects between consecutive frames of sequence, which may be caused by the relative movement between an object and a camera. The optical flow may include a 2 dimensional vector field where each vector may be a displacement vector showing the movement of points from a first frame to a second frame. For example, optical flow may be expressed as the following:

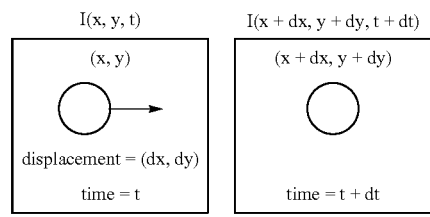

$$I(x, y, t) = I(x + dx, y + dy, t + dt)$$

The optical flow may provide the correspondence between two images (e.g., frames) that indicates where each pixel of the image has moved. The depth may provide the distance of the pixels between the camera and the characteristics captured in the image. Based on such variables, the motion of the observer may be estimated.

In step 308, the method may include the machine-learning model 304 outputting an uncertainty map 308. The uncertainty map 308 may indicate the reliability of the optical flow output. For example, a higher pixel value may indicate more uncertainty. Additionally, for example, a lower value may indicate less uncertainty.

In step 310, the method may include the optical flow map 306 outputting a feature map 310. The feature map may indicate movement of the one or more pixels. Additionally, the feature map 310 may be a less dense version of the optical flow map 306. For example, each pixel may be analyzed as a feature. The one or more pixels in the optical flow map 306 may be reduced by a particular ratio. For example, for every two pixels, one pixel may be removed. Additionally, the reduction may occur at some or all of the optical flow map 306. The reduction ratio may also differ, depending on the number of pixels in different areas of the optical flow map 306.

In step 312, the method may include applying the uncertainty map 308 to the feature map 310 to create an improved feature map 312. This step may include discarding unreliable points of the uncertainty map 308, where each of the points of the uncertainty map may correspond to one or more pixels of the image. The unreliable points of the uncertainty map 308 may be determined by discarding points that do not meet a threshold. In some embodiments, the unreliable points of the uncertainty map 308 may be determined by discarding points that surpass a threshold.

In step 314, the method may include transforming and optimizing the improved feature map. For example, the method may include receiving information from one or more sensors of the vehicle. Such information may be applied to the improved feature map to transform and optimize the improved feature map. Additionally, the optimization may be performed as a least squares problem.

In step 316, the method may include estimating the pose, velocity, and attitude 316 based on the transformed and optimized improved feature map.

An example of estimating the pose is as follows:

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

*2D image Coordinates*   *Intrinsic properties (Optical Centre,scaling)*   *Extrinsic properties (Camera Rotation and translation)*   *3D World Coordinates*

For example, the intrinsic properties (e.g., Optical Centre, scaling, or number of cameras) may be known information. The extrinsic properties (e.g., camera rotation and translation) may include data that is estimated based on the one or more images. The three dimensional world coordinates may be collected from the one or more images and/or a depth map (e.g., sensor or other software).

Additionally, for example, t1, t2, and t3 may represent the relative three-dimensional translation between two frames, which means the movement x, y, z of the camera when the two frames are caught. Additionally, the matrix of extrinsic properties (e.g., r11, r12, r13, r21, r22, r23, r31, r32, and/or r33) may be the rotation matrix. Solving the equation may result in the rotation of the camera when the two frames are caught. The above rotation matrix may belong to a 3D rotation group, often denoted SO(3). It may be the group of all rotations about the origin of three-dimensional Euclidean space $R^3$ under the operation of composition. The rotation matrix may also be converted to other formats, for example, angles. As a result, the relative translation and/or rotation between the frames may be attained, as well as the velocity.

By accumulation, a track of the trajectory may also be attained. The pose and/or attitude may also be calculated.

Figure 4:
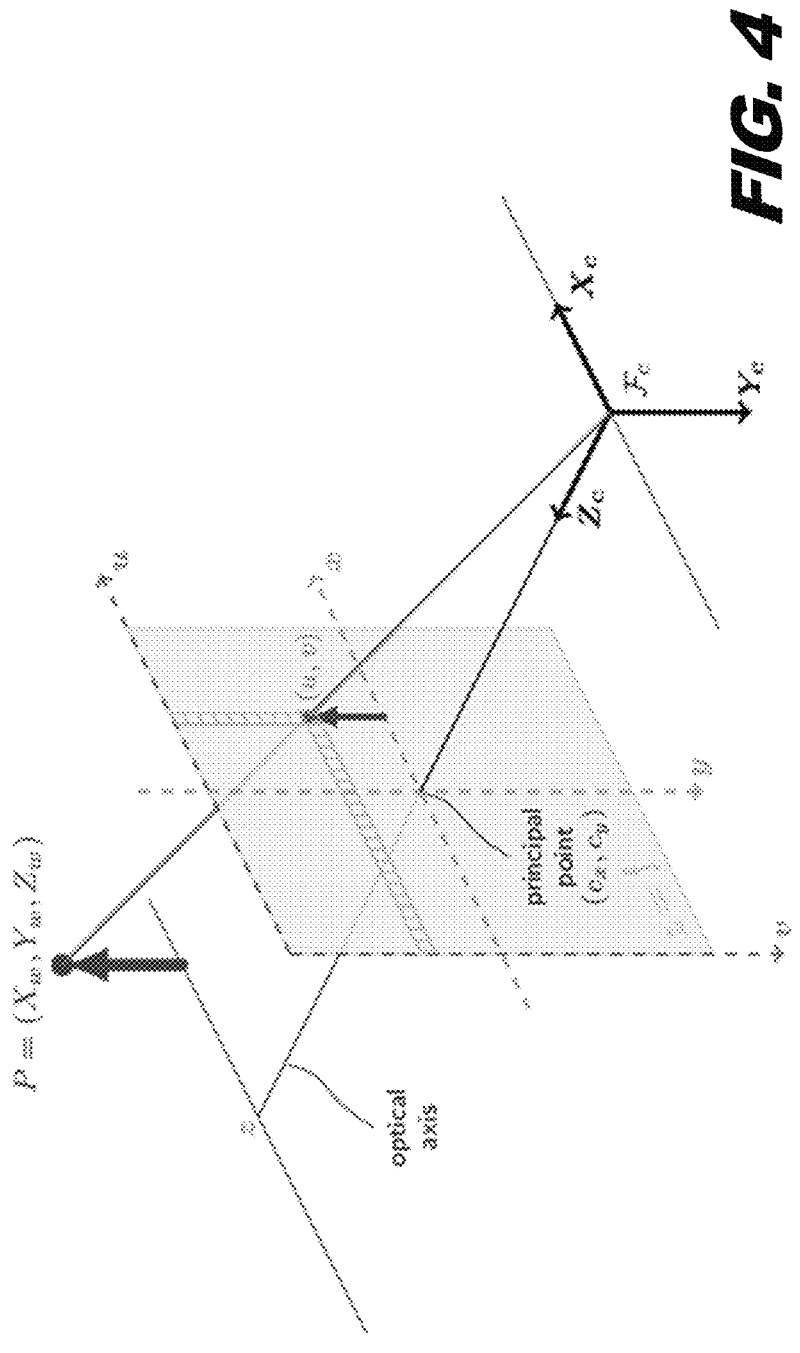
FIG. 4 depicts a diagram illustrating an exemplary methodology for calculating the pose.

FIG. 4 shows an example of how to calculate the pose. For example, FIG. 4 illustrates a scene view, which may be formed by projecting three-dimensional points into an image plan using a perspective transformation. At least three pixels may be needed to estimate the six parameters of a velocity vector. In some embodiments, calculating the pose may be formulated as a least squares problem. In FIG. 4, the coordinates of a three-dimensional point in the world coordinate space may include x, y, and z. Additionally, the coordinates of the projection point in pixels may include u and v.

Although FIG. 3 shows example blocks of exemplary method 300, in some implementations, the exemplary method 300 may include additional blocks, fewer blocks, different blocks, or differently arranged blocks than those depicted in FIG. 3. Additionally, or alternatively, two or more of the blocks of the exemplary method 300 may be performed in parallel.

Exemplary Method for Utilizing an Uncertainty Map

FIG. 5 illustrates an exemplary method 500 for utilizing an uncertainty map to select a best set of optical flow estimates for one or more vehicles, according to one or more embodiments. Notably, method 500 may be performed by one or more processors of a server that is in communication with one or more user devices and other external system(s) via a network. However, it should be noted that method 500 may be performed by any one or more of the server, one or more user devices, or other external systems. Exemplary method 500 may be executed on one or more components of FIGS. 1-2, and 4.

The method may include receiving, by one or more processors, one or more images captured by one or more cameras of at least one vehicle (Step 502). For example, the one or more images may be captured by camera 204 of vehicle 202. The at least one vehicle may include a UAV and/or a UAM. The camera may capture the one or more images while the at least one vehicle is in flight. Additionally, the camera may capture the one or more images while the at least one vehicle takes off or lands. The one or more images may include at least one image captured at time t and at least one image captured at time t+1. The one or more images may include one or more objects.

The method may include analyzing, by the one or more processors, the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map (Step 504). The trained machine-learning model may analyze and compare the one or more images to determine the optical flow map and the uncertainty map. The optical flow map may indicate a motion of the one or more objects in the one or more images. For example, the optical flow may indicate whether the one or more objects moved to the north, south, east, or west as the vehicle moved over the one or more objects and captured the one or more images. The uncertainty map may include one or more uncertainty values indicating a reliability of the optical flow map. For example, the one or more uncertainty values may include at least one high uncertainty value and at least one low uncertainty value. For example, a higher uncertainty (pixel) value may indicate more uncertainty. Additionally, for example, a lower uncertainty (pixel) value may indicate less uncertainty.

In some embodiments, the machine-learning model may have been trained using one or more images, one or more expected optical flow maps, and/or one or more expected uncertainty maps. Upon receiving the input, the machine-learning model may process the one or more images, one or more expected optical flow maps, and/or one or more expected uncertainty maps. The machine-learning model may then output, based on the processing, an optical flow map and an uncertainty map.

The method may include determining, by the one or more processors, a feature map based on the optical flow map (Step 506). The feature map may be a less dense version of the optical flow map. The feature map may be determined by applying at least one algorithm that reduces a pixel density of the optical flow map. The at least one algorithm may reduce the pixel density of the optical flow map by a set ratio. For example, for every two pixels, one pixel may be removed.

The method may include determining, by the one or more processors, an improved feature map by applying the uncertainty map to the feature map (Step 508). The improved feature map may include a reduced number of pixels of the feature map, where the reduced number of pixels are based on the application of the uncertainty map to the feature map.

In some embodiments, the determining the improved feature map may include analyzing, by the one or more processors, the one or more uncertainty values to determine at least one of the one or more uncertainty values that meet or fall below a threshold. For example, each pixel in the uncertainty map may have a corresponding uncertainty value. The method may include analyzing each of the uncertainty values that correspond to each pixel to determine whether such uncertainty value meets or falls below a threshold. In some embodiments, if the uncertainty value meets and/or falls below the threshold, the uncertainty value may not be applied in the next step. In some embodiments, if the uncertainty value surpasses the threshold, the uncertainty value may not be applied in the next step. Determining the feature map may further include applying, by the one or more processors, the at least one of the one or more uncertainty values that meet or fall below the threshold to the feature map. In some embodiments, determining the feature map may further include applying, by the one or more processors, the at least one of the one or more uncertainty values that surpass the threshold to the feature map.

The method may include transforming, by the one or more processors, the improved feature map by applying at least one transformation or optimization to the improved feature map (Step 510). The transforming the improved feature map may result in determining a velocity of the at least one vehicle. The at least one transformation may be based on applying one or more intrinsic properties of the one or more cameras and one or more extrinsic properties of the one or more cameras to the improved feature map. For example, the method may include receiving information from one or more sensors of the vehicle. Such information may be applied to the improved feature map to transform and optimize the improved feature map.

The method may include, based on the transformed improved feature map, estimating, by the one or more processors, a pose value, a velocity value, or an attitude value (Step 512). Examples of estimating the pose value, the velocity value, or the attitude value are further described in FIGS. 3 and 4.

In some embodiments, the method may include outputting, by the one or more processors, the pose value, the velocity value, or the attitude value to one or more user interfaces of a user device. For example, the pose value, the velocity value, or the attitude value may be displayed on a display of the at least one vehicle. In some embodiments, the pose value, the velocity value, or the attitude value may be displayed on a mobile device, tablet, and the like.

In some embodiments, the method may include storing, by the one or more processors, the pose value, the velocity value, or the attitude value in a data store for future analysis. The future analysis may include utilizing the stored pose value, the stored velocity value, or the stored attitude value for navigation of the at least one vehicle. For example, the pose value, the velocity value, or the attitude value may be collected from one or more aircraft and stored in the data store, where one or more systems may compile the values to provide navigation assistance to one or more vehicles.

Although FIG. 5 shows example blocks of exemplary method 500, in some implementations, the exemplary method 500 may include additional blocks, fewer blocks, different blocks, or differently arranged blocks than those depicted in FIG. 5 Additionally, or alternatively, two or more of the blocks of the exemplary method 500 may be performed in parallel.

Exemplary Device

Figure 6:
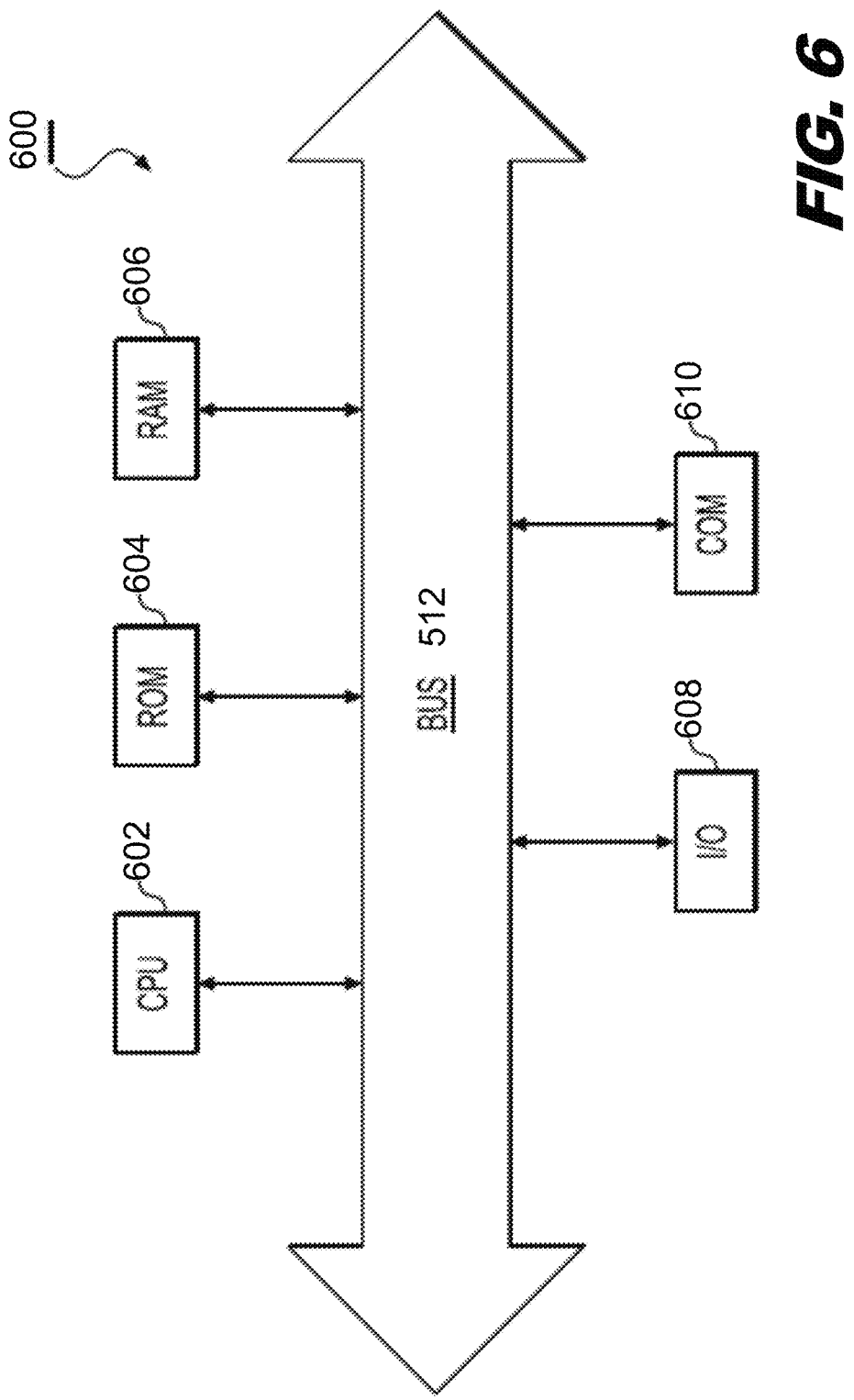
FIG. 6 depicts an example system that may execute techniques presented herein.

FIG. 6 is a simplified functional block diagram of a computer 600 that may be configured as a device for executing the methods of FIGS. 3 and 5, according to exemplary embodiments of the present disclosure. For example, device 600 may include a central processing unit (CPU) 602. CPU 602 may be any type of processor device including, for example, any type of special purpose or a general-purpose microprocessor device. As will be appreciated by persons skilled in the relevant art, CPU 602 also may be a single processor in a multi-core/multiprocessor system, such system operating alone, or in a cluster of computing devices operating in a cluster or server farm. CPU 602 may be connected to a data communication infrastructure 612, for example, a bus, message queue, network, or multi-core message-passing scheme.

Device 600 also may include a main memory 606, for example, random access memory (RAM), and also may include a secondary memory 604. Secondary memory 604, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 604 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 610. Communications interface 610 allows software and data to be transferred between device 600 and external devices. Communications interface 610 may include a modem, a network interface (such as an Ethernet card), a communications port, a PCMCIA slot and card, or the like. Software and data transferred via communications interface 610 may be in the form of signals, which may be electronic, electromagnetic, optical, or other signals capable of being received by communications interface 610. These signals may be provided to communications interface 610 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 608 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for utilizing an uncertainty map to select a best set of optical flow estimates for one or more vehicles, the method comprising:

receiving, by one or more processors, one or more images captured by one or more cameras of at least one vehicle;

analyzing, by the one or more processors, the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map;

determining, by the one or more processors, a feature map based on the optical flow map;

determining, by the one or more processors, an improved feature map by applying the uncertainty map to the feature map;

transforming, by the one or more processors, the improved feature map by applying at least one transformation or optimization to the improved feature map; and based on the transformed improved feature map, estimating, by the one or more processors, a pose value, a velocity value, or an attitude value.

2. The computer-implemented method of claim 1, wherein the transforming the improved feature map results in determining a velocity of the at least one vehicle.

3. The computer-implemented method of claim 1, the method further comprising:

outputting, by the one or more processors, the pose value, the velocity value, or the attitude value to one or more user interfaces of a user device.

4. The computer-implemented method of claim 1, the method further comprising:

storing, by the one or more processors, the pose value, the velocity value, or the attitude value in a data store for future analysis.

5. The computer-implemented method of claim 4, wherein the future analysis includes utilizing the stored pose value, the stored velocity value, or the stored attitude value for navigation of the at least one vehicle.

6. The computer-implemented method of claim 1, wherein the at least one transformation is based on applying one or more intrinsic properties of the one or more cameras and one or more extrinsic properties of the one or more cameras to the improved feature map.

7. The computer-implemented method of claim 6, wherein the intrinsic properties of the one or more cameras is an optical center, scaling, or number of cameras, and wherein the one or more extrinsic properties of the one or more cameras is camera rotation or translation.

8. The computer-implemented method of claim 1, the determining the improved feature map including:

analyzing, by the one or more processors, the one or more uncertainty values to determine at least one of the one or more uncertainty values that meet or fall below a threshold; and applying, by the one or more processors, the at least one of the one or more uncertainty values that meet or fall below the threshold to the feature map.

9. The computer-implemented method of claim 1, wherein the feature map is determined by applying at least one algorithm that reduces a pixel density of the optical flow map.

10. The computer-implemented method of claim 9, wherein the at least one algorithm reduces the pixel density of the optical flow map by a set ratio.

11. The computer-implemented method of claim 1, wherein the one or more uncertainty values includes at least one high uncertainty value and at least one low uncertainty value.

12. The computer-implemented method of claim 1, wherein the estimating, by the one or more processors, the pose value, the velocity value, or the attitude value comprises estimating the pose value, the velocity value, or the attitude value of the at least one vehicle that captured the one or more images.

13. A computer system for utilizing an uncertainty map to select a best set of optical flow estimates for one or more vehicles, the computer system comprising:

a memory having processor-readable instructions stored therein; and one or more processors configured to access the memory and execute the processor-readable instructions, which when executed by the one or more processors configures the one or more processors to perform a plurality of functions, including functions for:

receiving one or more images captured by one or more cameras of at least one vehicle;

analyzing the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map;

determining a feature map based on the optical flow map;

determining an improved feature map by applying the uncertainty map to the feature map;

transforming the improved feature map by applying at least one transformation or optimization to the improved feature map; and based on the transformed improved feature map, estimating a pose value, a velocity value, or an attitude value.

14. The computer system of claim 13, the functions further comprising:

storing the pose value, the velocity value, or the attitude value in a data store for future analysis.

15. The computer system of claim 13, the determining the improved feature map including:

analyzing the one or more uncertainty values to determine at least one of the one or more uncertainty values that meet or fall below a threshold; and applying the at least one of the one or more uncertainty values that meet or fall below the threshold to the feature map.

16. The computer system of claim 13, wherein the at least one transformation is based on applying one or more intrinsic properties of the one or more cameras and one or more extrinsic properties of the one or more cameras to the improved feature map.

17. The computer system of claim 13, wherein the feature map is determined by applying at least one algorithm that reduces a pixel density of the optical flow map.

18. The computer system of claim 17, wherein the at least one algorithm reduces the pixel density of the optical flow map by a set ratio.

19. A non-transitory computer-readable medium containing instructions for utilizing an uncertainty map to select a best set of optical flow estimates for one or more vehicles, the instructions comprising:

receiving one or more images captured by one or more cameras of at least one vehicle;

analyzing the one or more images by inputting the one or more images into a trained machine-learning model, wherein the trained machine-learning model is configured to process the one or more images to determine an optical flow map and an uncertainty map, the optical flow map indicating a motion of one or more objects in the one or more images, the uncertainty map including one or more uncertainty values indicating a reliability of the optical flow map;

determining a feature map based on the optical flow map;

determining an improved feature map by applying the uncertainty map to the feature map;

transforming the improved feature map by applying at least one transformation or optimization to the improved feature map; and based on the transformed improved feature map, estimating a pose value, a velocity value, or an attitude value.

20. The non-transitory computer-readable medium of claim 19, the determining the improved feature map including:

analyzing the one or more uncertainty values to determine at least one of the one or more uncertainty values that meet or fall below a threshold; and applying the at least one of the one or more uncertainty values that meet or fall below the threshold to the feature map.

* * * * *